United States Patent [19]
Smith et al.

[11] Patent Number: 6,059,371
[45] Date of Patent: May 9, 2000

[54] HINGE ASSEMBLY FOR PICKUP TRUCKS

[75] Inventors: Fred P. Smith, Alpine; Tim E. Grosland, Pleasant Grove; Todd Mendenhall, Riverton, all of Utah

[73] Assignee: Load Hog Industries, Inc., Aliquippa, Pa.

[21] Appl. No.: 09/094,213

[22] Filed: Jun. 9, 1998

[51] Int. Cl.[7] ...................................................... B60P 1/16
[52] U.S. Cl. ............................................................ 298/1 A
[58] Field of Search ................................. 298/1 A, 17 R; 296/184; 16/355, 356, DIG. 29

[56] References Cited

U.S. PATENT DOCUMENTS

| | | |
|---|---|---|
| 3,659,899 | 5/1972 | Phillips et al. . |
| 3,711,157 | 1/1973 | Smock . |
| 3,740,097 | 6/1973 | Parker et al. ............................ 298/1 A |
| 3,784,255 | 1/1974 | Smock . |
| 3,833,261 | 9/1974 | Dingler .................................... 298/1 A |
| 3,871,706 | 3/1975 | Odom ....................................... 298/1 A |
| 4,066,296 | 1/1978 | Ray, Jr. et al. . |
| 4,126,357 | 11/1978 | Day ......................................... 298/1 A |
| 4,168,861 | 9/1979 | Carroll . |
| 4,572,579 | 2/1986 | Saito . |
| 5,067,774 | 11/1991 | Trowland . |
| 5,513,901 | 5/1996 | Smith et al. . |
| 5,560,684 | 10/1996 | Gilmore . |
| 5,669,106 | 9/1997 | Daoud . |
| 5,704,095 | 1/1998 | Guenschel . |

FOREIGN PATENT DOCUMENTS

| | | |
|---|---|---|
| 30781/84 | 1/1985 | Australia . |
| 18662/88 | 1/1989 | Australia . |
| 2145041 | 3/1985 | United Kingdom . |
| WO 94/06649 | 3/1994 | WIPO . |

OTHER PUBLICATIONS

The Nathan Group, Troltip Catalog, Feb. 1989, 18 pages.
The Nathan Group, Troltip Catalog, undated, 6 pages.
The Nathan Group, Troltip Approval Letters, 11 pages.
The Nathan Group, Troltip Advertisements, 14 pages.

*Primary Examiner*—Stephen T. Gordon
*Attorney, Agent, or Firm*—Thorp Reed & Armstrong, LLP; Edward L. Pencoske

[57] ABSTRACT

A hinge for enabling the bed of a pick up truck to pivot is comprised of a lower hinge member having a first pin receiving portion and an inwardly extending portion adapted for connection to a truck frame. An upper hinge member has a second pin receiving portion, an inwardly extending portion adapted for connection to a truck bed, and an outwardly extending portion adapted for connection to a bumper. A pin is sized to fit within the first and second pin receiving portions for pivotally connecting the upper and lower hinge members. A portion of the upper hinge member forms a pseudo-frame to which the truck's bumper can be connected. A method of installing a hinge between a truck frame and a truck bed is also disclosed.

4 Claims, 6 Drawing Sheets

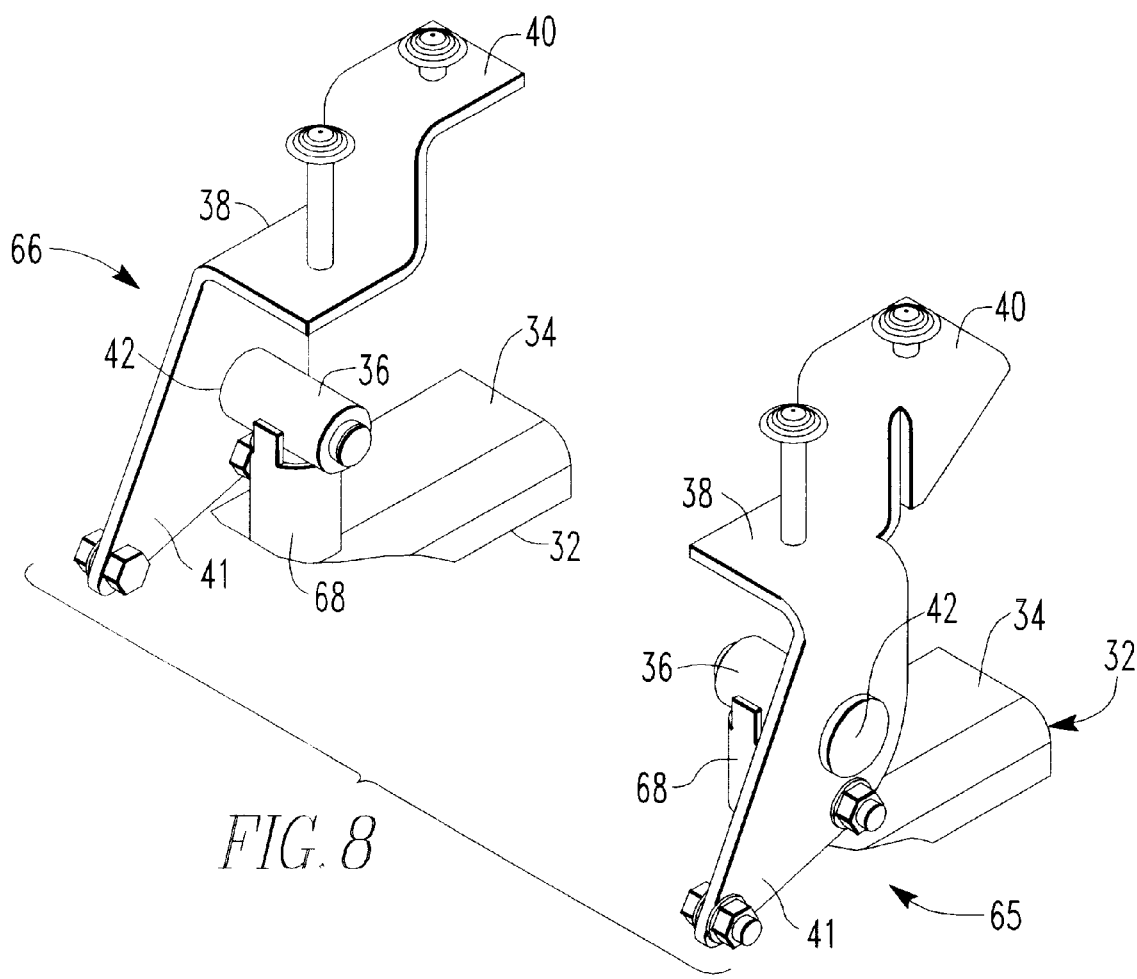

HINGE ASSEMBLY FOR PICKUP TRUCKS

FIELD OF THE INVENTION

This invention relates to a hinge assembly for pickup trucks that allows the bed of the truck to be converted from a fixed bed to a rotatable bed, without appreciably raising the bed height. More particularly, the invention allows for rotation of the truck bed while providing a mechanism for attachment of the original bumper to the rotating bed using the original brackets.

BACKGROUND OF THE INVENTION

Over the years, pickup trucks have become very popular. Owners buy them not only for their utility, but for their looks. The utility aspect of a pickup truck would be increased if the bed of the truck could be tilted to convert the pickup truck into a small dump truck. There are many instances where a small dump truck or dump trailer is desirable. Municipalities have many instances where a small amount of sand, gravel, or asphalt needs to be delivered to a site. Landscapers, gardeners, and even home owners could make use of such a dumping vehicle. This type of vehicle reduces costs and increases efficiency by allowing multiple uses of trucks already being used for other purposes. For a product such as this to be commercially viable, this dumping function must be able to be added easily with tools generally available to the truck owner, without affecting the aesthetic appearance of the truck.

There are many different types of hoist mechanisms for pickup trucks that accomplish the dumping actuation of the conversion. Some are a small versions of scissor lift mechanisms used on large dump trucks, such as disclosed in U.S. Pat. No. 4,066,296. Other dump mechanisms are actuated through the use of a gas filled bag. Some use other means such as hydraulic cylinders. For a pickup truck hoist to be commercially successful, the conversion must not affect the appearance of the pickup truck and the conversion must be able to be accomplished with tools generally available to the truck owner. With varying degrees of success, manufacturers have been able to accomplish this for the hoist part of the conversion. Sometimes the manufacturers will provide a hinge kit for rotatably mounting the truck bed to the truck chassis. These typically are mounted directly between the truck chassis and the bed. This generally raises the truck bed by at least ¾ of an inch (1.9 cm) or more. As disclosed in U.S. Pat. No. 4,168,861, the need to maintain the aesthetic appearance of the pickup truck by limiting the height that the truck bed is raised is essential. In pickup trucks of the prior art, a degradation of the body lines usually comes from having to raise the body substantially to install either the hoist or hinges. This degradation of the body lines, if substantially noticeable, would severely hamper the commercial viability of the product. Thus, an integral part of making a complete dump thick conversion to a pickup truck is the hinge and bumper attachment.

The method of hinging the bed and attaching the bumper on a pickup style of truck has always been a problem. Heretofore, pickup truck hoist manufacturers have left the bumper installation up to the truck owner or provided them with parts that must be taken to a weld shop to complete the bumper installation as disclosed in U.S. Pat. No. 4,168,861. Often, the truck owner is left to figure out how to attach the bumper. Frequently, the bumper is simply left off. Sometimes the truck owner is left to figure out how to cut off the bumper brackets so that they can be welded onto the bed hinge. That is also difficult because the typical truck owner does not have access to a welder. Hinge kits of the prior art have placed the pivot of the hinge toward the top of the chassis frame. That makes using the original bumper brackets an impossibility. The prior art has failed to provide a method of hinging the bed and attaching the bumper to the rotating part of the hinge with tools generally available to the truck owner.

SUMMARY OF THE INVENTION

The present invention is directed to a hinge for enabling the bed of a device for carrying a load, such as a truck, to pivot. The hinge is comprised of a lower hinge member having a first pin receiving portion and an inwardly extending portion adapted for connection to a truck frame. An upper hinge member has a second pin receiving portion, an inwardly extending portion adapted for connection to a truck bed, and an outwardly extending portion adapted for connection to a bumper. A pin member is sized to fit within the first and second pin receiving portions for pivotably connecting the upper and lower hinge members.

The rear bumper of a pickup truck is normally fixedly mounted to the truck chassis. For the truck bed to dump over a fixed rear bumper, the hinge would have to be located all the way to the rear of the truck bed. However, there is no structure to allow for a hinge in that location. The present invention provides a pseudo-frame that attaches to the rotating bed and allows the pivot for the hinge to be toward the bottom of the chassis. That allows the pseudo-frame to rotate away from the chassis. The hinge assembly of the present invention also incorporates the original bumper mounting, such that the truck owner can reuse the bumper that comes standard on the truck, without having to change the bumper brackets.

The upper hinge member that attaches to the truck bed gets its structural integrity from mounting to the rear-most cross member of the truck bed, using one of the same mounting holes that was used to mount the truck bed to the chassis frame, and another bolt directly to the truck bed. That mounting method allows mounting the upper member of the hinge while only having to raise the bed approximately ¼ of an inch (0.64 cm). Because the bed is raised only at the rear, the front of the bed can still sit directly on the truck chassis. That small amount of truck bed tilt is virtually undetectable. Because the front end of the truck body rests directly on the truck frame, the "lines" between the truck bed and truck cab are completely undisturbed.

The hinge assembly of the present invention can be applied to many different manufacturers' trucks without having to move cross members, spring hangers, etc. The lower hinge member is connected to the truck's chassis in such a manner that the force is directed into the chassis. The hinge of the present invention can be installed, and the bumper reinstalled, all with tools generally available to the truck owner. Those, and other advantages and benefits, will be apparent from the description of the preferred embodiment herein below.

BRIEF DESCRIPTION OF THE DRAWINGS

For the present invention to be readily understood and practiced, preferred embodiments will now be described, for purposes of illustration and not limitation, wherein:

FIG. 8 illustrates a hinge assembly of the present invention suitable for use on Ford pickup trucks.

DESCRIPTION OF A PREFERRED EMBODIMENT

Figure 1:
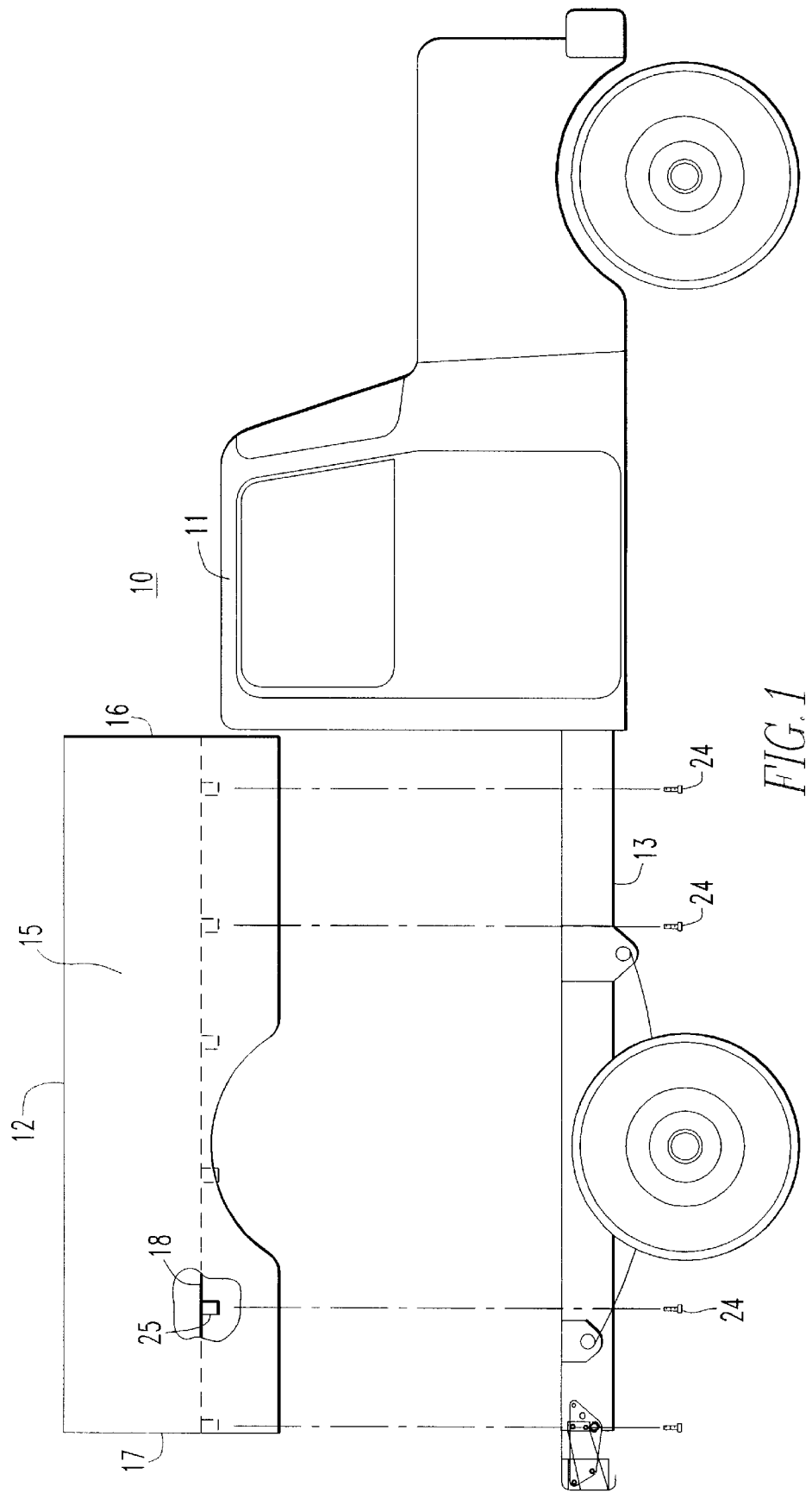
FIG. 1 illustrates a conventional pickup truck on which the present invention may be used.

FIG. 1 illustrates a conventional pickup truck 10 on which the present invention may be used. The reader should understand that although the present invention is described in connection with a pickup truck, the present invention may be used on other types of devices such as, for example, a trailer. The front part of the pickup truck 10 is generally known as the cab 11. The rear part of the pickup truck 10 is generally known as the truck bed 12. In FIG. 1, the truck bed 12 is shown removed from a chassis or frame 13. The bed 12 is generally comprised of two side walls 15, a front wall 16, a tail gate 17, and a floor 18.

Figure 6:
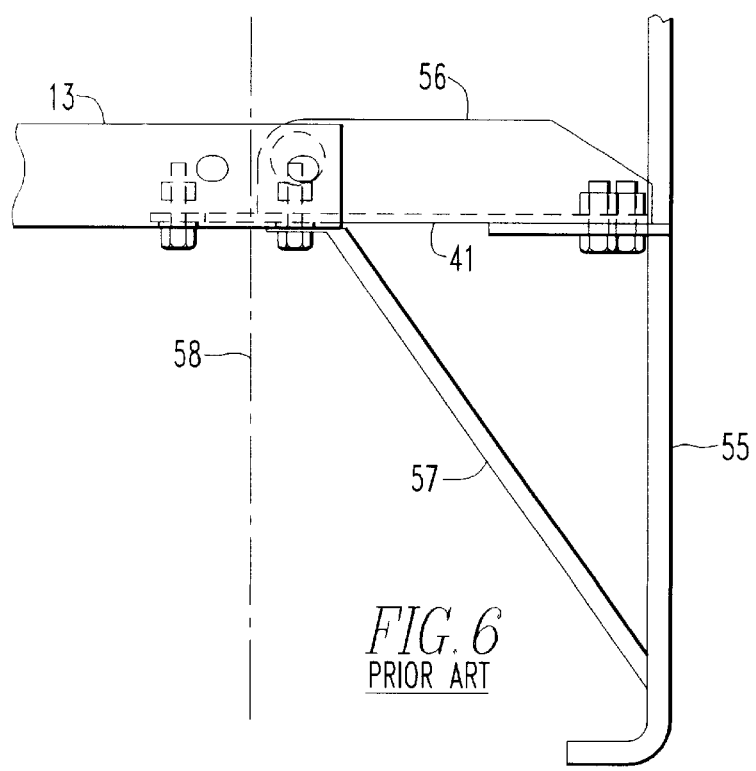
FIG. 6 illustrates a prior art bumper connection.

As seen best in FIG. 6, the frame is constructed of C-shaped members having a upper flange 20, a lower flange 21, and a web 22 connecting upper and lower flanges 20, 21 respectively. Returning now to FIG. 1, the truck bed 12 is generally fixedly attached to the frame 13 with a plurality of bolts 24. The bolts 24 extend through the upper flange 20 and thread into cross members 25 extending across truck bed 12. In making the conversion from a fixed bed 12 to a rotatable bed, the bolts 24 are removed such that the bed 12 may be lifted free of the frame 13.

Figure 2:
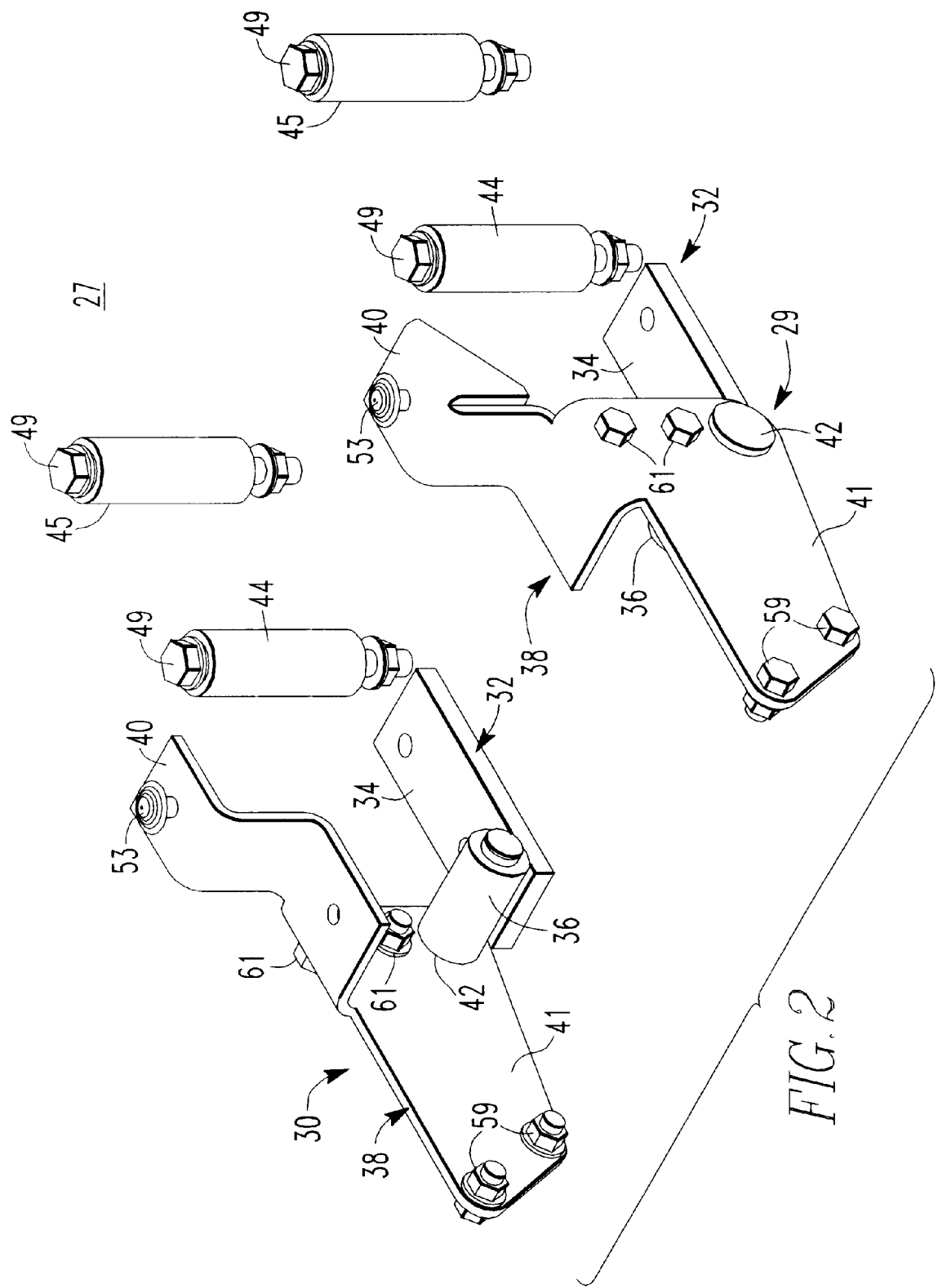
FIG. 2 illustrates a hinge assembly of the present invention suitable for use on Chevy pickup trucks.

One embodiment of a hinge assembly 27 of the present invention is illustrated in FIG. 2. The hinge assembly 27 illustrated in FIG. 2 has been designed for Chevy pickup trucks. The hinge assembly 27 is comprised of a right hinge 29 and a left hinge 30, which are mirror images of each other. Accordingly, only the right hinge 29 will be described in detail. The reader will understand that the description of the right hinge is equally applicable to the description of the left hinge 30.

The right hinge 29 is comprised of a lower hinge member 32 having an inwardly extending portion 34 adapted for connection to the truck frame and a first pin receiving portion 36. The right hinge 29 is also comprised of an upper hinge member 38 having an inwardly extending portion 40 adapted for connection to the truck bed 12, an outwardly extending portion 41 adapted for connection to a bumper, and a second pin receiving portion 42. The outwardly extending portion could extend laterally, i.e., to the right or left, or even inwardly depending on the bed/frame configuration.

In the embodiment shown in FIG. 2, the first pin receiving portion 36 is substantially cylindrical in shape while the second pin receiving portion 42 is an aperture. Those of ordinary skill in the art will recognize that physical embodiments other than the cylinder and aperture configuration may be utilized. Completing the description of the right and left hinges 29, 30, respectively, each of the hinges is provided with a pair of vertical members 44, 45. The purpose of the vertical members 44, 45, as more fully described below, is to transfer force from the inwardly extending portion 34 of the lower hinge members 32 to the truck frame 13.

Figure 3:
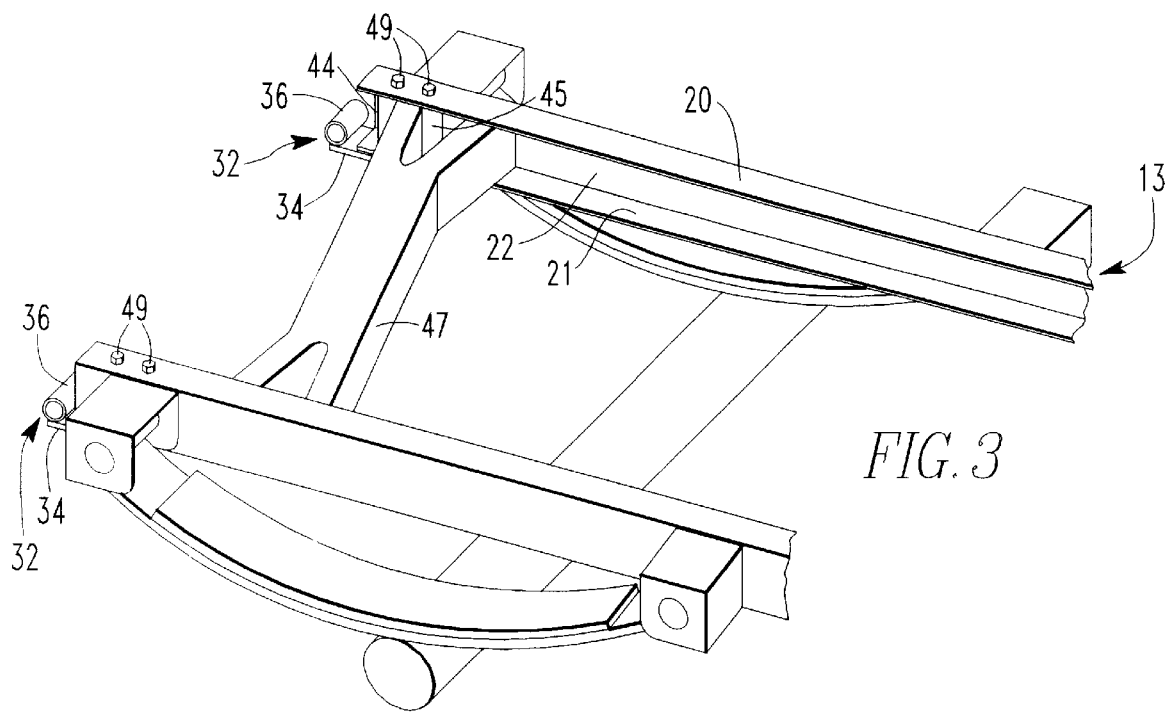
FIG. 3 is a perspective view of the lower hinge members of FIG. 2 connected to a truck frame.

The mounting of the hinge assembly 27 will now be described in conjunction with FIGS. 3, 4, and 5. As can be seen in FIG. 3, the interior of the frame 13 may have cross members 47 or other items such as a gas tank, wiring, etc. that would make mounting of the right and left hinges, 29 and 30, respectively, to the frame 13 impractical. Likewise, mounting the right and left hinges to the outside of the frame 13 is not practical because of items mounted there on certain trucks. However, the underside of the lower flange 21 is generally available. As a result, the inwardly extending portion 34 of the lower hinge member 32 is connected, typically by bolting, to the underside of the lower flange 21.

In certain circumstances, the lower flange 21 may not be strong enough, acting alone, to support all of the force to which the lower hinge member 32 is exposed. To overcome that difficulty, the present invention utilizes vertical members 44 and 45. Vertical members 44 and 45 may be tube-like in construction. As seen in FIG. 2, the inwardly extending portion 34 has two apertures extending therethrough. Two corresponding apertures are drilled in the lower flange 21 while two corresponding apertures are drilled in upper flange 20. Thereafter, bolts 49 may be placed through the apertures in upper flange 20, through tube-like vertical members 44, 45, through the apertures in lower flange 21, and finally through the apertures in inwardly extending portion 34. The bolts may be fastened by nuts in a typical fashion. That method of attachment allows the force experienced by lower hinge members 32 to be effectively transferred to the entire frame 13 without interfering with clearance needed for cross members 47 or other components.

Figure 4:
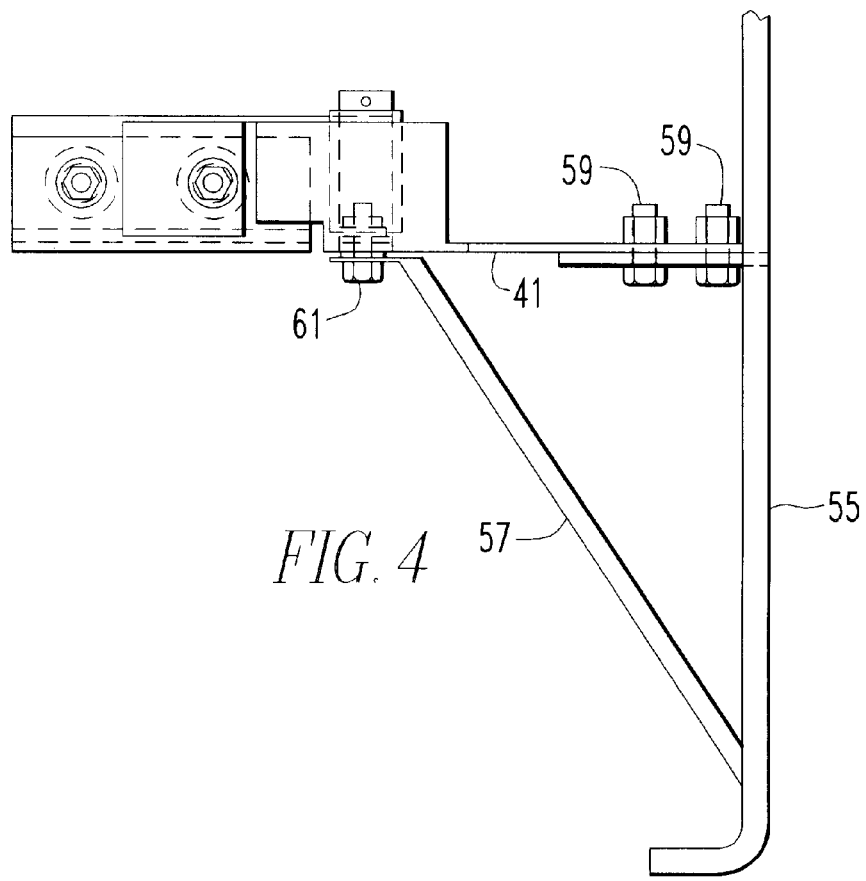
FIGS. 4 and 5 are top and side views, respectively, of a hinge of FIG. 2 connected to a truck frame and truck bed, with a bumper connected to the upper hinge member.
Figure 5:
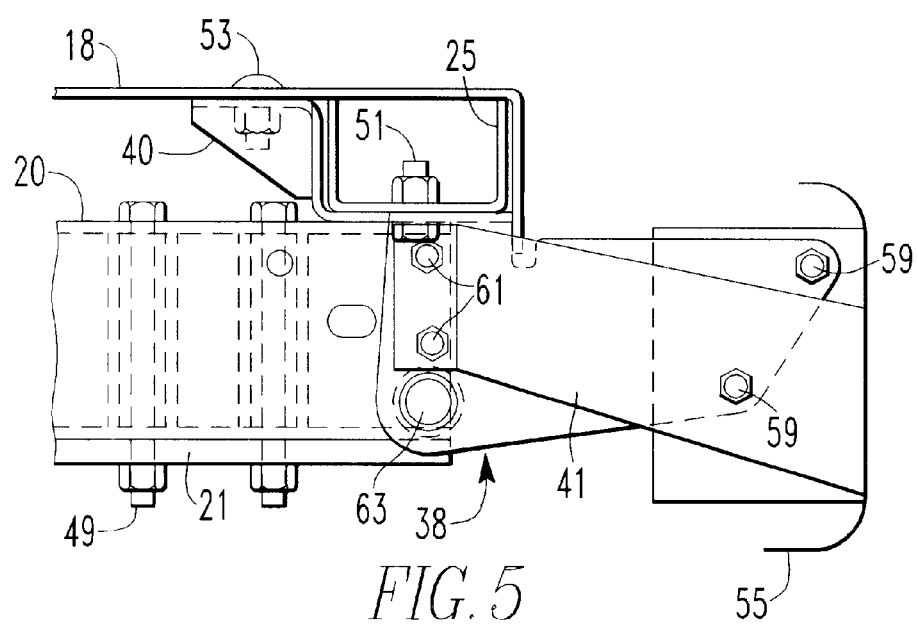

FIGS. 4 and 5 are top and side views, respectively, of a hinge of FIG. 2 connected to a truck flame 13 and a truck bed 18. As seen best in FIG. 5, the inwardly extending portion 40 has a first aperture which enables the upper hinge member 38 to be connected to cross member 25 of the bed 18 by, for example, bolt 51. The inwardly extending portion 40 has a second aperture which allows the upper hinge member 38 to be connected directly to the floor 18 through the use of, for example, bolt 53.

On most pickup truck frames 13, as seen in FIG. 6, a bumper 55 is attached to the frame 13 by means of an extender beam 56 and a gusset beam 57. One end of the extender beam 56 attaches to the end of the chassis 13 and the other end attaches to the bumper 55. In some cases, the extender beam 56 mounts to the outside of the frame 13 rather than as an insert to the frame 13 as shown in FIG. 6. The gusset beam also attaches to the end of the chassis frame 13 and goes out to the bumper 55 at an angle. Extender beam 56 and gusset beam 57 are securely bolted to frame 13. In the present invention, the extender beam 56 is unbolted and discarded. The last couple of inches of the frame 13 where the extender beam 56 and gusset beam 57 were mounted are cut off at line 58 using a hack saw or other metal cutting reciprocating saw.

As seen in FIGS. 2, 4, and 5, bumper 55 is connected directly to outwardly extending portion 41 through the use of bolts 59. The outwardly extending portion 41 of upper hinge member 38 thus takes the place of the extender beam 56. The gusset beam 57 can also be attached to the lower hinge member 32 through the use bolts 61. That provides a structurally sound method of attaching the bumper 55 while at the same time allowing the bumper 55 to rotate with truck bed 12.

The upper hinge member 38 and the lower hinge member 32 are pivotably connected by a pivot pin 63 which extends through the first pin receiving portion 36 of the lower hinge member 32 and the second pin receiving portion 42 of the upper hinge member 38. To ensure that there is no interference between the bumper 55 and frame 13, the pivot point defined by pin 63 must be located at the bottom, i.e., near lower flange 21, of the frame 13. In that manner, when rotation occurs, components will be rotating away from each other rather than into each other. It also has the further advantage that the front wall 16 of the truck bed 12 will rotate away from the truck cab 11 and that in the tilted position, the overall height will be lower, thereby reducing the tendency to tip over. Lowering the pivot point does make the moment on the hinges 29, 30 in the dumping mode higher, but the inwardly extending portion 40 of the upper hinge members 38 can be made large enough to transfer the moment from the hinges 29, 30 up into the truck bed 12.

Because a portion of the frame 13 is cut and removed, and that portion is replaced by a portion of the upper hinge member 38, that portion of the upper hinge member 38 may be considered a pseudo-frame. The pseudo-frame may extend outwardly to encompass the outwardly extending portion 41 which provides for the mounting of the bumper 55.

Figure 7:
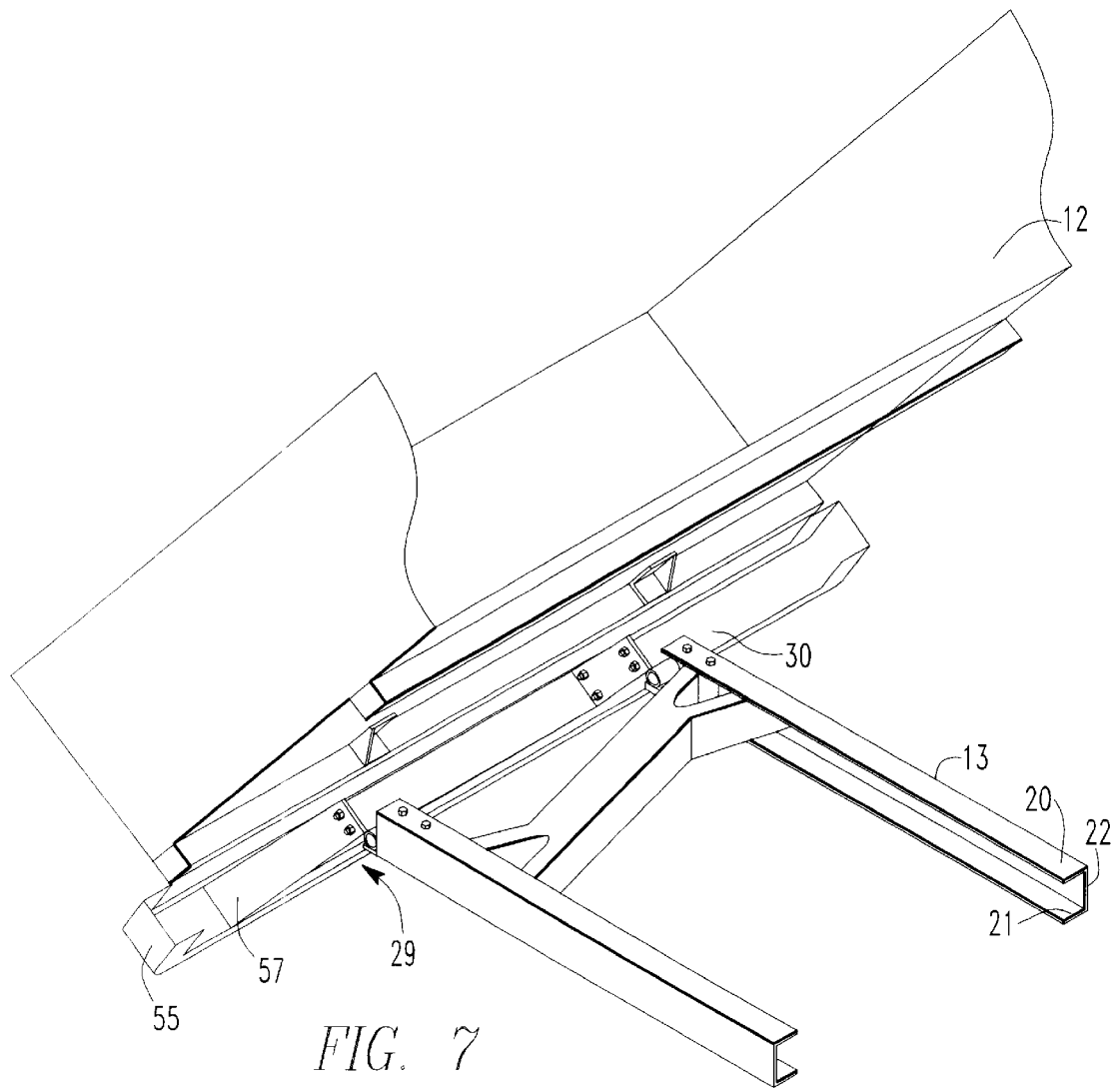
FIG. 7 illustrates a pickup truck modified to accommodate the hinge assembly of the present invention.

FIG. 7 shows the right and left hinges 29, 30, respectively affixed to the chassis 13 and the truck bed 12 with the truck bed 12 in the raised position. In the raised position, with the pivot point 63 close to the bottom flange 21 of the frame 13, there is a substantial bending moment input into the upper hinge member 38. However, the width of the pseudo-frame provides a large enough section modulus to carry the moment up to inwardly extending portions 40 so that bolts 51 and 53 can convey it into the truck bed 12.

FIG. 8 illustrates a hinge assembly of the present invention suitable for use on Ford pickup trucks. Components performing like functions are provided with the same reference numeral. As before, the right hinge 65 is a mirror image of the left hinge 66 such that only one of the hinges need be described.

The right hinge 65 is comprised of a lower hinge member 32 and an upper hinge member 38. The lower hinge member 32 has an inwardly extending portion 34. In the case of a Ford truck, the inwardly extending portion 34 can be sufficiently connected to the lower flange 21 such that vertical members 44, 45 are not needed. The lower hinge member 32 is provided with a riser member 68 for raising the level of the first pin receiving portion 36. The right hinge 29 has an upper hinge member 38 having an inwardly extending portion 40, an outwardly extending portion 41, and a second pin receiving portion 42.

After the rear most portion of the frame 13 has been cut along line 58 as discussed above in conjunction with FIG. 6, the lower hinge members 32 are connected to the lower flange 21 through the use of a bolt. In the case of Ford trucks, it is not necessary to use the vertical members 44 and 45 as a sufficient connection to the frame 13 can be obtained. The upper hinge member 38 is connected in a manner similar to that previously discussed. Thereafter, each of the hinges 29, 30 operates in a manner similar to that previously discussed.

The present invention is also directed to a method of installing a hinge between a truck frame and a truck bed. The method is comprised of the step of removing the truck's bumper. That may entail removing both an extender beam and a gusset beam. Part of the truck's frame is then removed, for example by cutting, and discarded. A lower binge member is connected to the truck's frame. An upper hinge member is connected to the truck's bed. The upper and lower hinge members are connected with a pin such that a portion of the upper hinge member forms a pseudo-frame located in the position previously occupied by the removed part of the truck frame. The bumper is then attached to the upper hinge member. Because the upper hinge member acts as a pseudo-frame, the bumper is connected using the same extender beam and gusset beam. On certain models, the extender beam may be replaced by an outwardly extending portion of the upper hinge member. The method of the present invention can be performed by the truck owner using common tools likely to be owned by the truck owner.

While the present invention has been described in connection with preferred embodiments thereof, those of ordinary skill in the art will recognize that many modifications and variations are possible. The foregoing description and the following claims are intended to cover all such modifications and variations.

We claim the following:

1. A hinge for enabling the bed of a vehicle to pivot, comprising:
    a lower hinge member having a first pin receiving portion and an inwardly extending portion adapted for connection to a vehicle frame;
    an upper hinge member having a second pin receiving portion, a portion adapted for connection to a vehicle bed, and means for connection to a bumper and for replacing part of the vehicle frame; and
    a pin member sized to fit within said first and second pin receiving portions for pivotably connecting said upper and lower hinge members.

2. The hinge of claim 1 wherein said first and second pin receiving portions are located on said lower and upper hinge members, respectively, so as to place said pivotable connection substantially adjacent to a lower flange of the vehicle frame.

3. The hinge of claim 1 wherein said inwardly extending portion is adapted for connection to a lower flange of the vehicle frame, said hinge additionally comprising a vertical member adapted for transferring force from said inwardly extending portion to an upper flange of the vehicle frame.

4. The hinge of claim 1 wherein said first and second pin receiving portion's are located such that a gap between the vehicle bed and the vehicle frame is not greater than approximately 0.25 inches.

* * * * *